United States Patent
Maciesowicz

(10) Patent No.: US 7,917,662 B2
(45) Date of Patent: *Mar. 29, 2011

(54) UNIVERSAL GRAPHIC ADAPTER FOR INTERFACING WITH UGA HARDWARE FOR SUPPORT OF RANGES OF OUTPUT DISPLAY CAPABILITIES

(75) Inventor: Maciej Maciesowicz, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/484,024

(22) Filed: Jun. 12, 2009

(65) Prior Publication Data

US 2009/0313392 A1    Dec. 17, 2009

Related U.S. Application Data

(62) Division of application No. 11/837,830, filed on Aug. 13, 2007, now Pat. No. 7,552,244, which is a division of application No. 10/885,955, filed on Jul. 7, 2004, now Pat. No. 7,257,650, which is a division of application No. 10/157,067, filed on May 29, 2002, now Pat. No. 6,907,482.

(60) Provisional application No. 60/341,140, filed on Dec. 13, 2001.

(51) Int. Cl.
   G06F 3/00 (2006.01)
   G06F 13/00 (2006.01)
   G06F 9/445 (2006.01)

(52) U.S. Cl. .......... 710/9; 710/8; 710/16; 710/104; 710/302; 345/1.1; 345/5; 345/520; 345/698; 713/1; 713/2; 713/100; 709/323; 709/324

(58) Field of Classification Search .......... 710/8, 9, 710/104, 302, 16–19; 713/1, 2, 100; 345/1.1, 345/5, 520, 698
See application file for complete search history.

(56) References Cited

U.S. PATENT DOCUMENTS

| | | | |
|---|---|---|---|
| 5,438,663 A | 8/1995 | Matsumoto et al. | |
| 6,049,316 A | 4/2000 | Nolan et al. | |
| 6,081,891 A | 6/2000 | Park | |
| 6,583,771 B1* | 6/2003 | Furuhashi et al. | 345/1.1 |
| 6,697,033 B1 | 2/2004 | Leung et al. | |
| 6,928,543 B2 | 8/2005 | Hendry et al. | |

OTHER PUBLICATIONS

"Introduction to Windows 2000 Drivers", pp. 1-19, Microsoft Corporation, Oct. 9, 2000.*

(Continued)

*Primary Examiner* — Tammara Peyton
(74) *Attorney, Agent, or Firm* — Shook, Hardy & Bacon L.L.P. Intellectual Property Department

(57) ABSTRACT

The subject invention relates to a Universal Graphics Adapter (UGA) that is a hardware-independent design that encapsulates and abstracts low-level graphics hardware in a standard manner through firmware. UGA is a firmware standard, intended to wrap existing or planned hardware, including VGA. UGA does not require the use of real-mode assembly language, direct hardware register, or frame buffer access to program, thus providing advantages over conventional systems. UGA supports basic drawing operations, continuous display modes, and power management. As a firmware-based standard, UGA facilitates updating a system to support both evolving and new hardware features. UGA includes the capability to determine ranges of output display capabilities for multiple devices and determine an overlap in capabilities of the multiple devices.

10 Claims, 9 Drawing Sheets

OTHER PUBLICATIONS

European Search Report Dated Feb. 17, 2003 for European Application Serial No. 02025052-8.
Microsoft Corp., Universal Graphics Adapter: Firmware Solution for Low-Level Graphics Support, Jun. 2002, pp. 1-6.
B. Haakenson, Examining the VESA VBE 2.0 Specification: Extending the VESA Standard, Dr. Dobb's Journal, vol. 20, Jul. 1995, pp. 80-83.

S. Thompson, VGA-Design Choices for a New Video Subsystem, vol. 27, 1988, pp. 185-197.

EFI Universal Graphics Adapter (VGA), by Intel, Aug. 27-30, 2001, website: http://developer.intel.com/technology/efi/vga_idf_final_revz.pdf. 37 pages.

* cited by examiner

UNIVERSAL GRAPHIC ADAPTER FOR INTERFACING WITH UGA HARDWARE FOR SUPPORT OF RANGES OF OUTPUT DISPLAY CAPABILITIES

CROSS-REFERENCE TO RELATED APPLICATION

This application is a divisional of U.S. patent application Ser. No. 11/837,830, filed Aug. 13, 2007, entitled UNIVERSAL GRAPHICS ADAPTER FOR INTERFACING WITH UGA HARDWARE FOR SUPPORT OF A PLURALITY OF ENUMERATED DEVICES, which issued Jun. 23, 2009 as U.S. Pat. No. 7,552,244, which is a divisional of U.S. patent application Ser. No. 10/885,955, filed Jul. 7, 2004, entitled UNIVERSAL GRAPHICS ADAPTER, which issued on Aug. 14, 2007 as U.S. Pat. No. 7,257,650, which is a divisional application of U.S. patent application Ser. No. 10/157,067, filed May 29, 2002, entitled UNIVERSAL GRAPHICS ADAPTER, which issued on Jun. 14, 2005 as U.S. Pat. No. 6,907,482, which claims the benefit of U.S. Provisional Application Ser. No. 60/341,140, filed on Dec. 13, 2001, entitled UNIVERSAL GRAPHICS ADAPTER, the entireties of which are incorporated herein by reference.

TECHNICAL FIELD

The present invention relates generally to video graphics display and more particularly to hardware independent video display facilitated through firmware services that abstract video hardware and expose an interface to an operating system.

BACKGROUND OF THE INVENTION

Video graphics array (VGA) is a graphics display system for personal computers (PCs). VGA has become one of the de facto standards for PCs, providing a resolution of 720 by 400 pixels in text mode and a choice of resolutions in graphics mode (e.g., 640 by 480 by 16 colors, 320 by 200 by 256 colors). VGA is a hardware specific standard that employs analog signals, not digital signals. Other standards have appeared since the 1987 VGA debut but VGA remains the lowest common denominator standard and thus substantially all PCs support VGA. However, VGA has drawbacks.

For example, VGA is hardware specific and thus to program to VGA requires knowledge of hardware, software, and assembly and/or machine language, which makes such programming difficult. Furthermore, some of the original requirements of VGA are becoming harder to support as the PC continues to evolve, requiring extensive rework of assembler and/or machine coded BIOS (Basic Input Output System) code to support enhancements. The VGA standard from the 1980s makes demands on hardware and software that are outdated today, such as the use of Int 10 services, a non-linear frame buffer, a limited range of display modes, and direct register addressing using real-mode assembly language. Further limitations include that BIOS code executes in a real-mode x86 environment and that the video BIOS image is restricted to an absolute maximum of 64K. Additionally, VGA is tied to legacy I/O (Input/Output) and memory usage that has a non-relocateable memory and a non-intuitive, non-linear frame buffer layout. Also, VGA has limited mode support (e.g., 80×25×70 Hz characters and 640×480×16-color graphics). VGA also does not support power management, which has become increasingly important in mobile computing environments. Also, there is no firmware support of VGA adapters in a multiple-monitor configuration under existing operating systems.

Substantially all display devices support VGA in addition to the high-performance device capabilities they expose. Many PCs require a VGA device to be in the machine before the system can boot and BIOS Power-On Self Test (POST) messages require a VGA device for display. In addition to being a de facto universal standard, VGA is also now a dated standard, with capabilities that have not changed significantly as the PC platform has evolved.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

Universal Graphics Adapter (UGA) is a hardware-independent design that encapsulates and abstracts low-level graphics hardware in a standard manner through firmware. UGA is a firmware standard, intended to wrap existing or planned hardware, including VGA. UGA does not require the use of real-mode assembly language, direct hardware register, or frame buffer access to program, thus providing advantages over conventional systems. UGA supports basic drawing operations, continuous display modes, and power management. As a firmware-based standard, UGA facilitates updating a system to support both evolving and new hardware features.

UGA mitigates shortcomings of VGA without making basic graphical operations more difficult to perform. For example, use of firmware to wrap hardware implementations facilitates a variety of display adapters complying with a UGA specification without requiring hardware changes. An example UGA firmware interface specification is attached hereto as Appendix A and which is considered part of this patent application specification. UGA facilitates devices supporting multiple BIOS, including both UGA and VGA BIOS in, for example an Option ROM (Read Only Memory). The VGA register set will not be changed, so hybrid display adapters will continue to work in existing machines, as well as working with a UGA-enable operating system. From one point of view, UGA extends the concepts of Plug and Play (PnP) and ACPI (behind the PCI bus) by providing standardized enumerating and manipulating of child devices of display adapters.

UGA features include, but are not limited to: hardware details being wrapped by firmware; exposed device capabilities being implemented in firmware; native mode support being exposed by firmware; not requiring access to legacy I/O ports or memory; employing Base Address Registers (BARs) in PCI (Peripheral Component Interconnect, a local bus standard) space only; not requiring real-mode execution environment; not limiting size of BIOS to 64K; facilitating adding new functionality to the BIOS; cross-platform support (e.g., x86, Itanium); improved overall graphics hardware and driver quality, and being able to code a BIOS in a higher level language (e.g., C vs. assembler/machine).

UGA benefits different classes of user in different ways. For example, substantially all users benefit from an improved pre- and post-boot experience. When users first switch on computers, they will be presented with a high-resolution graphical display on which an OEM (Other Equipment Manufacturer) can place graphics during and/or before a power on self-test (POST). This can include, for example, tools for repairing or configuring the system that follow the same paradigm as the operating system. An experienced user who wants to take advantage of multi-monitor support will not be required to understand how to disable the VGA BIOS on one of the display adapters. Users upgrading from earlier releases of operating systems on mobile PCs that lack high-performance display drivers can benefit from power-managed driver support, unlike the conventional VGA driver.

UGA has other benefits. For example, a BIOS can be developed in a high-level language (e.g., C, C#) rather than in assembler. Thus, a BIOS will be easier to maintain, because high-level language programming skills are more widely available than assembler skills. Furthermore, the BIOS size will not be restricted to 64K, so support for new features can be added as they become available and required. Display adapters will be platform independent, freed from the hardware restrictions for Int 10 support or x86 assembler thus facilitating adapting and evolving new display hardware. New display adapters will not be required to support the VGA register set in new display adapters, thus facilitating innovation in adapter design. Display hardware can be made to support UGA through firmware, which can reduce die size. Furthermore, independent hardware vendors will not be required to supply a UGA device driver, since a UGA driver can be provided as part of an operating system. Thus, adapters should be more timely brought to market.

Operating systems can provide a UGA driver. A UGA Hardware Abstraction Layer (HAL) wraps both native UGA driver support and the VGA driver, which facilitates a system supporting the transition between VGA and UGA devices. In one example of the present invention, if both supported types are available, a system can be configured to default to UGA.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS AND APPENDICES

FIG. 1 compares a BIOS with UGA firmware abstracting UGA hardware through an exposed interface and a conventional VGA specific BIOS interacting with a register interface.

Figure 1:
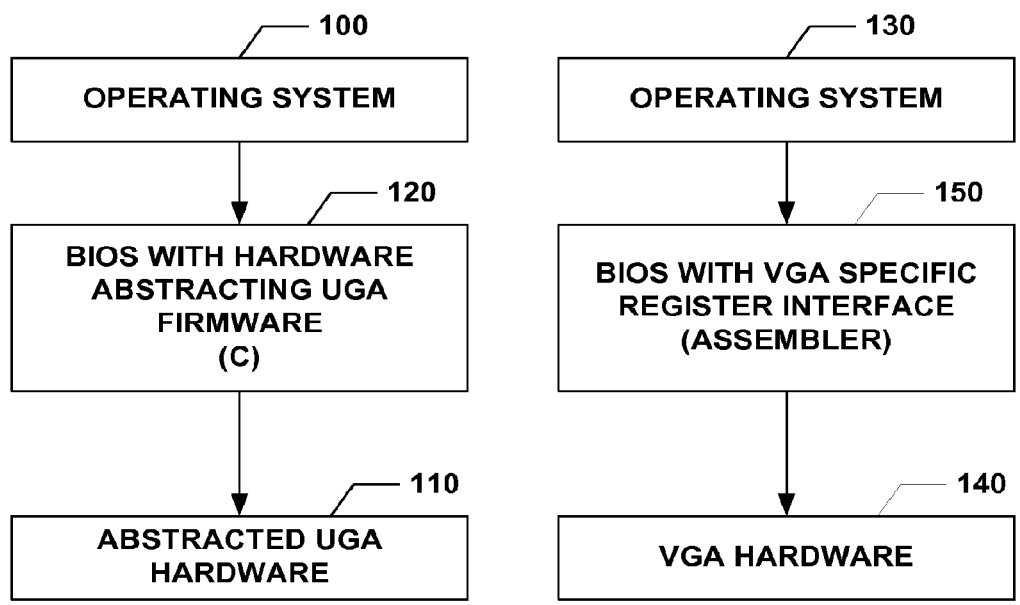

Appendix A is an example UGA firmware interface, and this Appendix is considered part of this patent application specification.

Appendix B is an example Extensible Firmware Interface Universal Graphics Adaptor (EFI-UGA) Binding Protocol, and this Appendix is considered part of this patent application specification.

DETAILED DESCRIPTION

The present invention is now described with reference to the drawings, where like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. In other instances, well-known structures and devices are shown in block diagram form in order to facilitate description of the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program and a computer. By way of illustration, both an application running on a server and the server can be computer components. One or more computer components may reside within a process and/or thread of execution and a computer component may be localized on one computer and/or distributed between two or more computers.

UGA is a next generation graphics adapter technology that succeeds VGA. UGA abstracts graphics hardware and exposes a UGA firmware interface that facilitates platform independent interaction between entities on the different sides of the firmware interface (e.g., an operating system and a graphics display device). The UGA firmware interface is exposed from UGA firmware. In one example of the present invention, the system firmware and UGA HAL driver employ the interface to perform basic operations with the UGA hardware. This layer replaces legacy video BIOS. In the example, UGA firmware exports a single entry point to the external world (e.g., system firmware, operating system runtime). One example exported entry point is UgaFwDispatchService, which is responsible for dispatching a UGA I/O request to an appropriate handler within the UGA firmware, based on a UGA device type and I/O request type. One example UGA specification therefore defines five UGA device types (UgaDtParentBus, UgaDtGraphicsController, UgaDtOutputController, UgaDtOutputPort, UgaDtOther) to facilitate interacting with an operating system through the entry point.

UGA supplies high resolution, high color, multiple monitor support, GDI (Graphics Device Interface) acceleration and LFB (Linear Frame Buffer) layout independence. UGA defines an interface that IHVs (Independent Hardware Vendors) can implement on UGA hardware to facilitate interacting with an operating system via a UGA firmware. Thus, as an operating system, firmware and/or hardware evolve, so long as the interfaces between such entities are maintained, such changes can be independent of the other entities, which minimizes the impact of such changes on related entities, providing advantages over conventional systems where the impact can be greater. For example, a graphics display hardware component can be updated to provide a higher resolution. So long as the hardware component maintains the interface to the UGA firmware, neither the UGA firmware nor the operating system are required to change due to the graphics display hardware change. This provides an advantage over conventional systems where a hardware component upgrade can require patching the operating system with which it operates.

UGA facilitates dispatching I/O service requests for display controller firmware, facilitates reporting, negotiating and configuring display capability ranges for output controllers and devices, facilitates enumerating display controller devices and their children, and facilitates power management of display controller devices and their children. Such services facilitate producing a platform independent graphics display environment, providing advantages over conventional systems.

UGA defines a firmware interface specification for firmware that can be written in a high level language (e.g., C, C#) that can be compiled to be interpreted by a system BIOS and/or operating system virtual machine p-code and/or byte code. The UGA firmware can be located in a display device and/or in a system for an integrated environment.

Turning now to FIG. 1, by employing the present invention, an operating system 100 can interact with abstracted UGA hardware 110 via a UGA firmware 120 stored in a BIOS. Such firmware can be interpreted byte code that was compiled from a higher level language (e.g., C, C#) that executes in an on-board execution environment. The firmware 120 can implement an interface that facilitates non-hardware specific interactions between the operating system 100 and the hardware 110. Such an interface can include abstractions like device_on, device_off, device_accept_data, device_provide_data, and device_report_children. One example interface is described in Appendix A. Such an interface facilitates a flexible approach for operating system to hardware interaction wherein the details of how the hardware will perform certain tasks are restricted to the hardware. This is contrasted with the conventional situation where an operating system 130 interacts with a VGA hardware 140 through a VGA specific, hardware specific, BIOS 150 that implements the standard VGA register interface. The BIOS 150 is conventionally coded in a lower level language (e.g., assembler, machine language).

Figure 2:
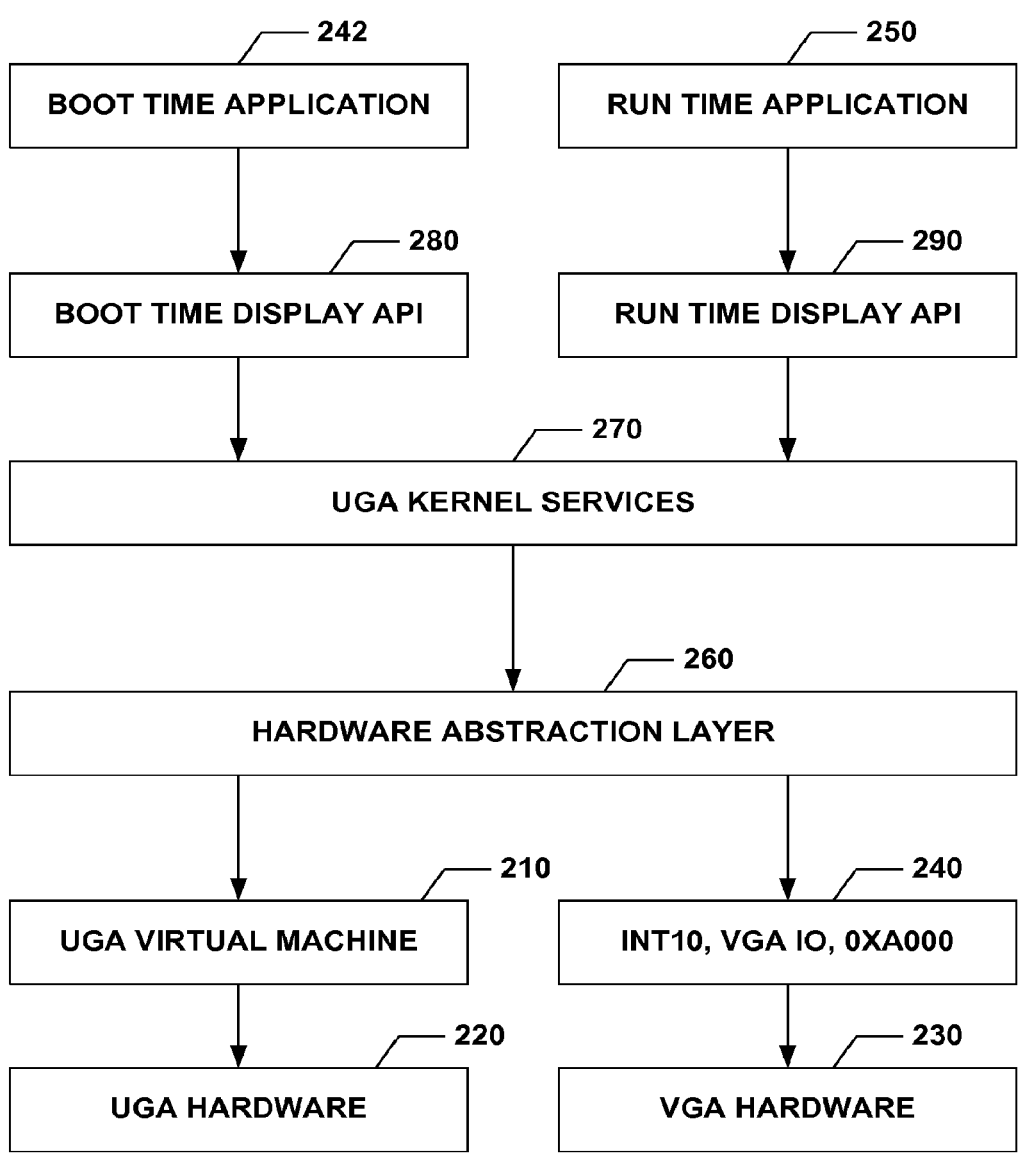
FIG. 2 illustrates a sample architecture of a UGA enabled operating system, in accordance with an aspect of the present invention.

Turning now to FIG. 2, a system 200 that includes a UGA virtual machine 210 that facilitates access via a UGA interface to UGA hardware 220 is illustrated. The UGA virtual machine 210 can be implemented in firmware and stored in a BIOS on a chip associated with the UGA hardware 220. The system 200 illustrates one configuration of computer components wherein legacy compatibility with VGA hardware 230 is maintained. Conventionally, access to VGA hardware 230 has been via an Int 10, VGA I/O register interface 240.

In the system 200, a boot time application 242 and/or a run-time application 250 can consider the system 200 to have only UGA hardware 220 through the interaction of a hardware abstraction layer 260 (HAL) and a UGA kernel services 270. The HAL 260 abstracts the details of video display hardware into an interface. The boot time application 242 calls a boot time display API (Application Programming Interface) 280 to perform actions like displaying messages during POST and/or to display a power on banner (e.g., trademark screen). The run time application 250 calls a run time display API 290 to perform display functions (e.g., display text, display graphics). Although the boot time application 242 and/or run time application 250 may desire to interact with UGA hardware 220, the system 200 may only have VGA hardware 230. Thus, the HAL 260 can implement abstracted methods to work with VGA hardware 230 through the conventional register interface 240. However, when UGA hardware 220 is present, the HAL 260 can implement the abstracted methods to work through the UGA virtual machine 210 to interact with the UGA hardware 220.

Figure 3:
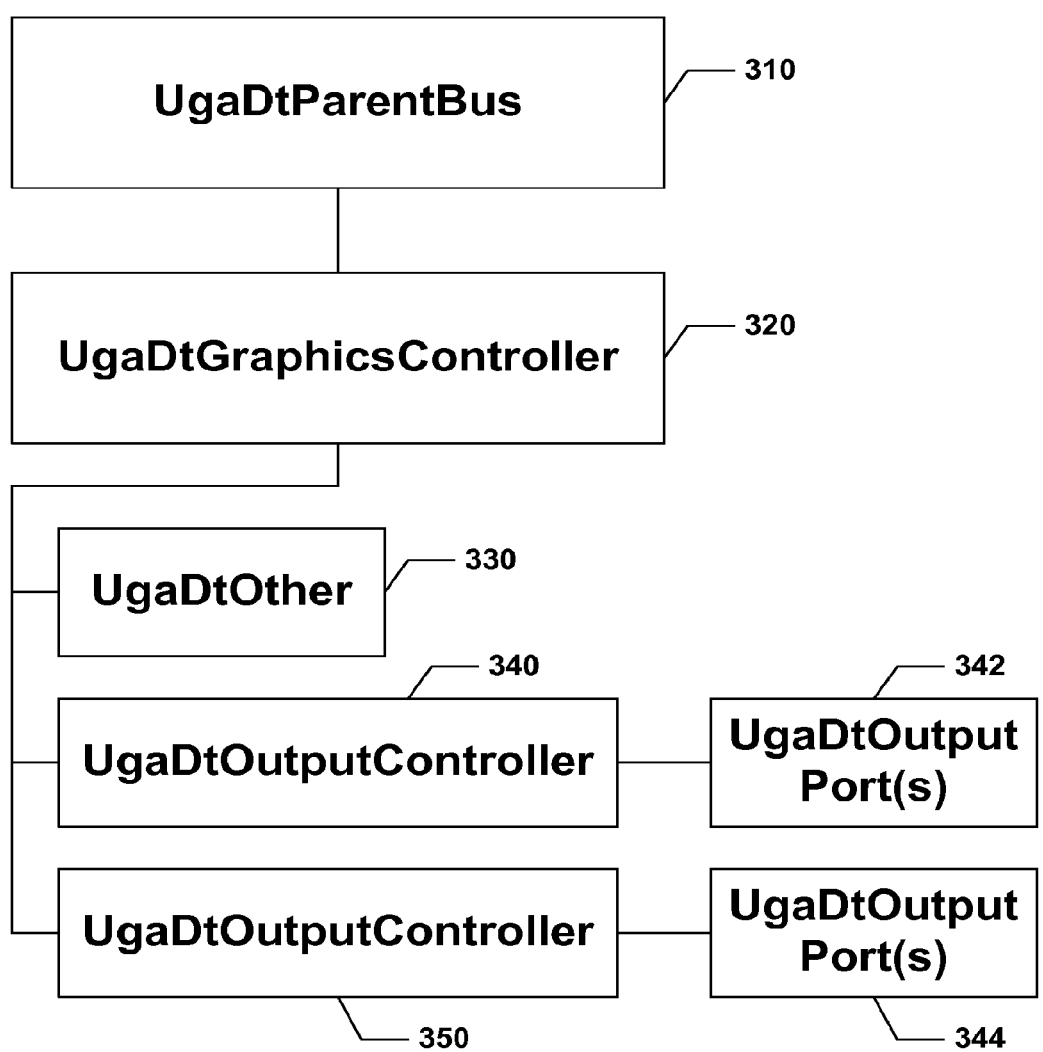
FIG. 3 illustrates a sample UGA device tree for a UGA enabled display adapter, in accordance with an aspect of the present invention.

Turning now to FIG. 3, a hierarchy 300 of computer components associated with UGA are illustrated. The hierarchy 300 includes five sample devices defined in the example UGA firmware specification attached as appendix A that facilitate communicating through devices to attached devices. At the top of the hierarchy 300 is a parent device 310 (e.g., UgaDtParentBus). An operating system can interact with the parent device 310, which may be a physical and/or logical device, through the UGA firmware interface. Two pieces of information are employed to communicate with a device, a device identifier (e.g., with which device do you wish to communicate) and a request type (e.g., what would you like the device to do). In one example of the present invention, what the user would like the device to do is referred to as a service. A UGA firmware interface can define a set of services for devices to perform. Such services can include, but are not limited to, power management (e.g., turn on, turn off, go to lower power state, go to higher power state), device description (e.g., provide EDID (extended display identification data standard) data), and data communications (e.g., accept data, provide data).

The hierarchy 300 also includes a graphic controller (e.g., UgaDtGraphicsController). Such a controller can perform functions (e.g., services) for the operating system and can also interact with other child computer components (e.g., devices). For example, one or more other devices 330 (e.g., UgaDtOther) can be logically and/or physically connected to the controller device 320. An operating system can communicate through the parent device 310 to the graphics controller 320 and thus to the other device(s) 330. Similarly, an operating system can communicate through the parent device 310 to the graphics controller 320 and thus to an output controller 340 or 350 (e.g., UgaDtOutputController). While one other device 330 and two output controllers 340 and 350 are illustrated, it is to be appreciated that a variety of combinations of such devices can be employed with the present invention. The output controller 340 could be connected with an actual output device (e.g., an output port 342 associated with a monitor) and the output controller 350 could be connected with another actual output device (e.g., an output port 344 associated with a television).

The hierarchy 300, an example of which is defined in the UGA firmware specification attached in Appendix A, thus facilitates operating system communications with actual output devices and physical and/or logical devices residing between the operating system and the actual device. In one example of the present invention, one or more of the computer components identified in the hierarchy 300 can be located on a video graphics adapter card. By way of illustration, a video graphics card could have two output ports, one for a television output and one for a computer monitor output. Such outputs could be operatively connected to output controllers that facilitate performing actions like identifying the capabilities of the output devices and performing power management for the devices. Similarly, the output controllers could be operatively connected to a graphics controller, which is in turn operatively connected to a bus that facilitates connecting the video graphics adapter card to a host system. Conventionally, individually accessing more than one physical and/or logical entity on a video graphics card via the VGA register interface was impractical, if possible at all. Thus, the UGA firmware interface provides advantages over conventional systems with respect to accessing multiple physical and/or logical devices located on one physical device.

Figure 4:
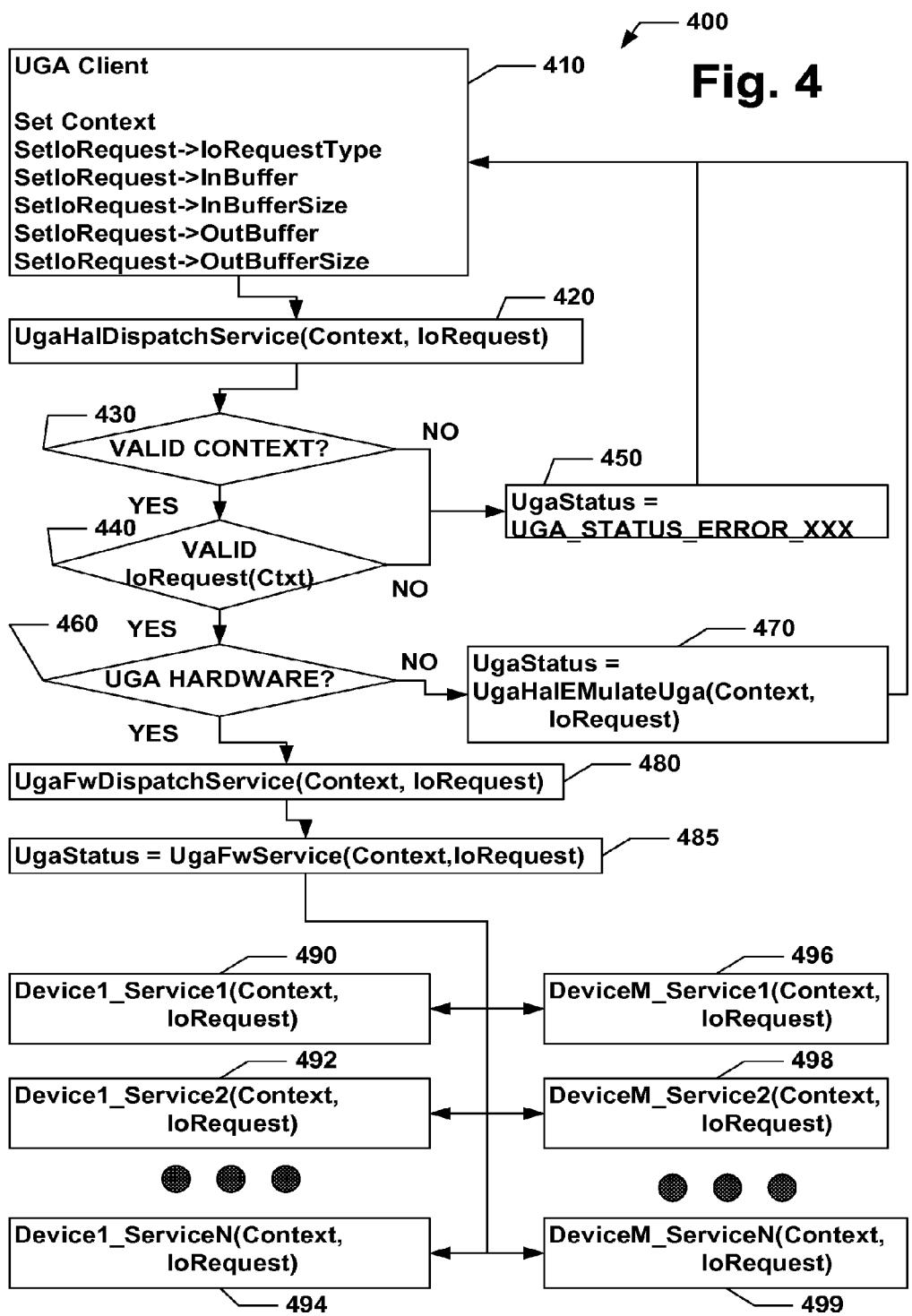
FIG. 4 is a flow chart that illustrates UGA I/O service request dispatching, in accordance with an aspect of the present invention.
Figure 5:
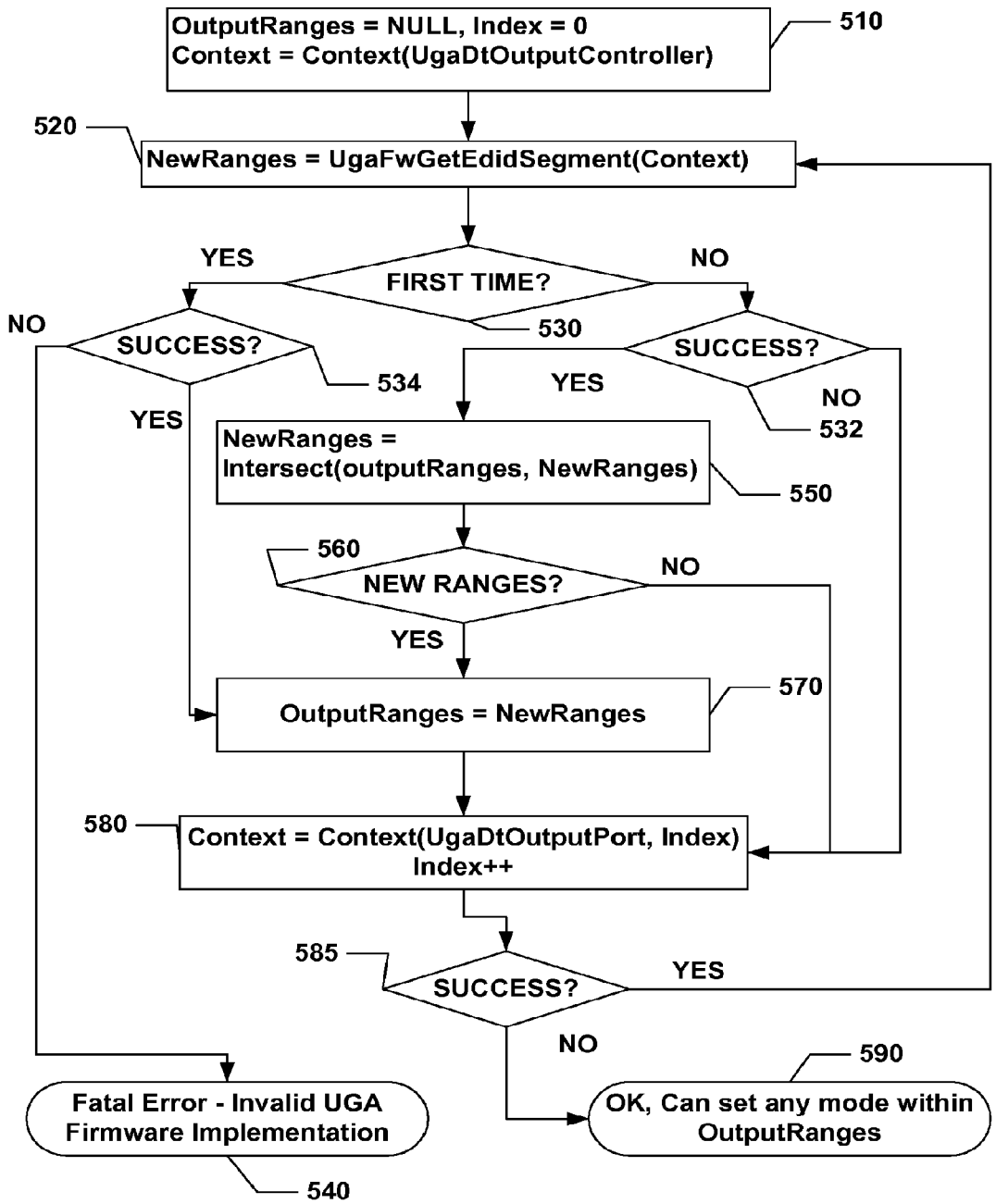
FIG. 5 is a flow chart that illustrates UGA output range negotiating, in accordance with an aspect of the present invention.
Figure 6:
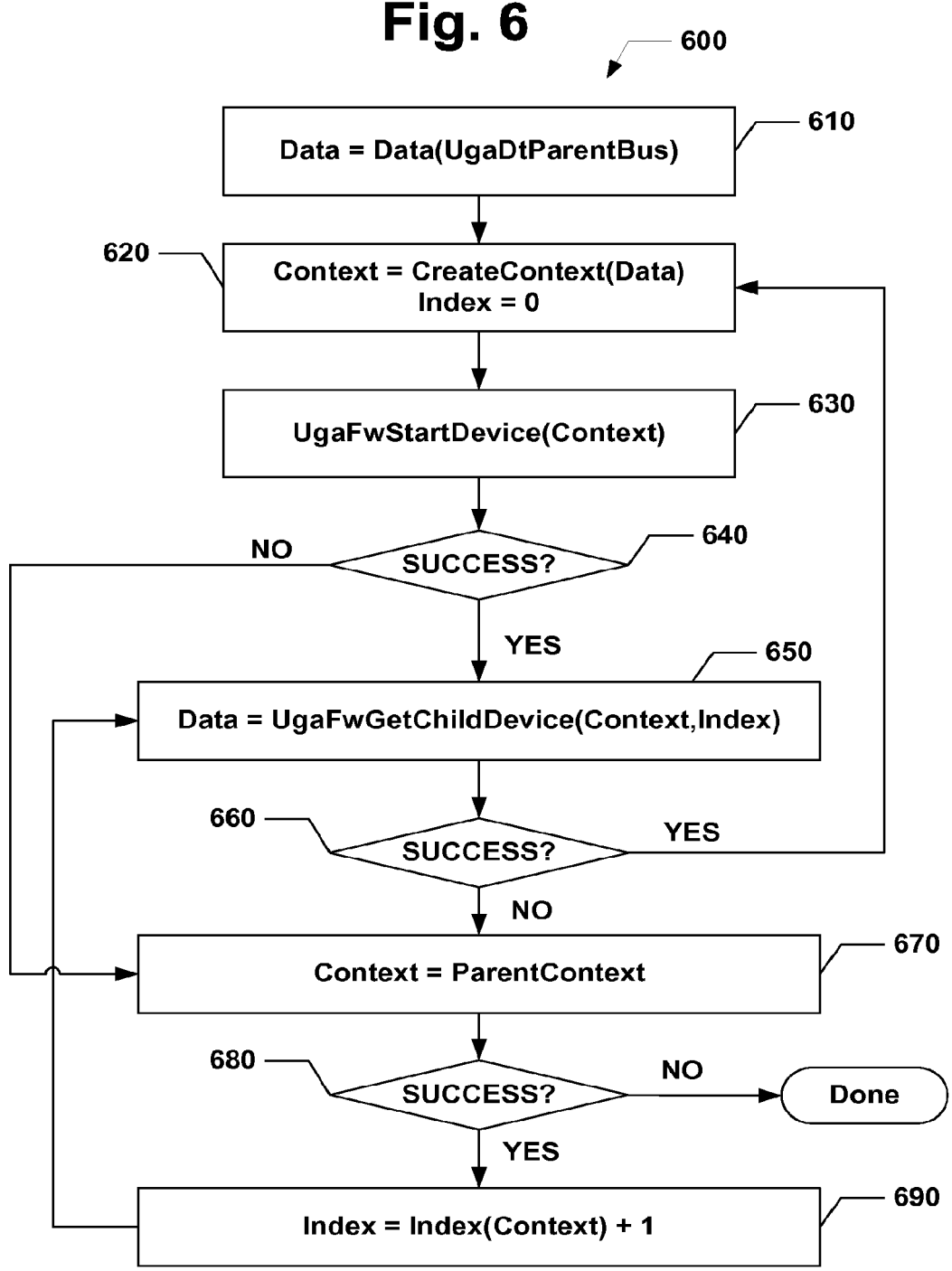
FIG. 6 is a flow chart that illustrates UGA device enumerating, in accordance with an aspect of the present invention.

In view of the exemplary systems shown and described above, methodologies that are implemented in accordance with the present invention will be better appreciated with reference to the flow diagrams of FIGS. 4 through 6. While for purposes of simplicity of explanation, the illustrated methodologies are shown and described as a series of blocks, it is to be understood and appreciated that the present invention is not limited by the order of the blocks, as some blocks can, in accordance with the present invention, occur in different orders and/or concurrently with other blocks from that shown and described herein. Moreover, not all illustrated blocks may be required to implement a methodology in accordance with the present invention. Furthermore, additional and/or alternative methodologies can employ additional blocks, not illustrated herein. In one example of the present invention, such methodologies can be implemented as computer executable instructions and/or operations, which instructions and/or operations can be stored on computer readable media including, but not limited to an ASIC, a CD, a DVD, a RAM, a ROM, a PROM, an EEPROM, a disk, a carrier wave, and a memory stick.

Turning now to FIG. 4, a method 400 for I/O service request dispatching is flow-charted. At 410, a UGA client establishes a context that includes establishing information like, a device identity, a location and size of an input buffer, a location and size of an output buffer, and a request type. At 420, a method (e.g., UgaHalDispatchService (Context, IoRequest) is called to begin dispatching the abstracted service through the layers of the UGA firmware interface. At 430, a determination is made concerning whether the context established at 410 is valid and at 440 a determination is made concerning whether the requested I/O action is valid. If the determination at either 430 or 440 is NO, then processing proceeds to 450 where a status code is generated. But if the determinations 430 and 440 are YES, then processing proceeds to 460.

At 460, a determination is made concerning whether there is UGA hardware available for the abstracted UGA service that has been requested. If the determination at 460 is NO, then there is no UGA hardware, and the abstracted UGA calls can be processed by emulation to interact with the VGA hardware that is available. But if the determination at 460 is YES, then at 470 the service is dispatched to the next lowest level in the UGA firmware interface. Similarly, at 480, the service is dispatched to the next lowest level until, at 490 through 499, the actual service routine is invoked. The service routines 490, and 492 through 494 represent a set of services for a first UGA device. The service routines 496, and 498 through 499 represent a set of services for a second UGA device. UGA devices implement a set of abstracted UGA services. Thus, UGA devices can appear like an abstracted hardware that implements an interface to a UGA client, which simplifies operating system to hardware communications and control. This abstraction contrasts directly with the conventional VGA register interface, where the operating system has to be aware of and implement the register interface for communications with VGA hardware.

Thus, to invoke a UGA firmware method, a UGA client can call an entry point (e.g., UgaFwDispatchService) that is exported from UGA firmware supplying UGA device specific context and UGA I/O request blocks. The UGA device context is employed by the UGA firmware to identify a UGA device for which the I/O request is intended. The UGA client provides a memory storage for a UGA device context, a UGA I/O request block and input and output buffers associated with the UGA I/O request block. The UGA client populates a UGA I/O request block request code, and the location(s) and size(s) of input and/or output buffers. Upon successful completion of an I/O request, UGA firmware places the number of returned bytes into an I/O request block and can, based on UGA I/O request code and device context, fill the output buffer with the requested data. UGA firmware can return a status code indicating the status (e.g., success/failure) of the I/O request for each UGA I/O request.

A UGA firmware runtime environment (e.g., system firmware, operating system) can implement a UGA Hardware Abstraction Layer (UGA HAL) to facilitate a common interface to UGA and non-UGA (e.g., VGA) display devices. Thus, a firmware client can assume that UGA firmware is available and for non-UGA devices, the UGA HAL facilitates translating UGA I/O requests from the UGA client and non-UGA (e.g., VGA, firewire, network) output device. Furthermore, firmware that is UGA specification compliant can be implemented for display controller devices that are not local. Remote display devices appear as a local display device to the UGA client, including the UGA HAL.

Turning now to FIG. 5, a method 500 for negotiating output ranges is flow-charted. Output ranges are associated with what a display device can do. For example, a first display device may be able to display 640 by 480@60 Hz while a second display device may be able to display 1280 by 1024@80 Hz. If both display devices are associated with the same graphics controller, then the present invention can be employed to ascertain the intersection between the performance capabilities of the devices.

At 510, initial values are established. Such initial values can include, but are not limited to, establishing an index to the set of available devices and establishing a context for the output controller. At 520, information concerning the capabilities of a device are read. For example, a UgaFwGetEdidSegment(context) call can be made to retrieve EDID data (e.g., 128 byte, 256 byte) descriptions of the capabilities of a device. Such EDID data can contain discrete values (e.g., for a device with one capability) and/or a range of values (e.g., for multi-capability devices). A determination at 530 is made concerning whether this is the first device read. If so, then a determination is made at 534 concerning whether the data read succeeded. If not, then a fatal error has occurred and processing proceeds to 540. But if the read succeeded, then at 570, the currently determined output ranges are established as the initial ranges read at 520. If this was not the first read, then a determination is made at 532 concerning whether the read succeeded. If the read did not succeed, then processing continues at 580, where the next potential device is identified and a context is established to facilitate reading description data from that next device. If the read did succeed, then processing continues at 550 where an intersection between previously determined ranges and the currently read range is performed. At 560, a determination is made concerning whether the intersection computation has determined a new range. If so, then at 570, the determined intersection ranges are updated and processing proceeds to 580.

At 585, a determination is made concerning whether there is another device from which descriptive data is to be read. If the determination is YES, then processing proceeds to 520 where such descriptive data is read. If the determination is NO, then processing concludes and video modes that lie within the determined output ranges can safely be employed.

Thus, system firmware and/or an operating system intersect display capabilities data returned for output controllers and output ports attached to the controllers. The intersections define video mode ranges that are supported by connected devices. Thus, a mode identified in the intersection can be set on an output controller and can be displayed on the output device attached to the output port attached to the output controller.

Based, at least in part, on the EDID data returned for output ports and/or controllers, supported, intersected video mode ranges may contain discreet or contiguous sets of available modes. Thus, system firmware and/or an operating system can request a mode from the intersected ranges. Then the system firmware and/or operating system can invoke a UGA firmware video setting method (e.g., UgaFwSetVideoMode) on an output controller specifying device context, I/O request type and requested mode data (e.g., horizontal resolution, vertical resolution, color depth, refresh rate) and based on such information the UGA firmware can dispatch an I/O handler method for the I/O request and the UGA child device. The UGA firmware can employ, for example, a table driven algorithm that analyzes discrete mode ranges and/or a timing formula (e.g., VESA GTF) for contiguous and/or discreet mode ranges to program UGA hardware to set a requested mode.

FIG. 6 illustrates a flow chart for a device enumeration method 600. At 610, a recursive enumeration method begins by acquiring data associated with an initial device (e.g., UgaDtParentBus). Given the initial data, at 620, a context can be created to facilitate interacting with the device. Thus, at 630, the context is employed to start the initial device via, for example, a UgaFwStartDevice call. At 640, a determination is made concerning whether the device could be started. If not, then the context is set to the parent context at 670. If the device could be started, then processing proceeds to 650 where an attempt to acquire data associated with a child device associated with the current device is made. For example, a UgaFwGetChildDevice call can be made to retrieve the child data. At 660, a determination is made concerning whether child data was acquired. If the determination at 660 was NO, then, processing proceeds to 670 where the context is set to be the context of the parent device. But if the determination at 660 was YES, then processing returns to 620 where a context is created for the child device and the depth first traversal continues to search for children of this child device.

At 680, a determination is made concerning whether there was a valid parent context. If not, then the depth first traversal has completed. If so, then processing proceeds to 690 where the next iteration of the recursive enumeration is begun.

Such a recursive enumeration method facilitates UGA firmware supporting a variety of devices. A UGA firmware specification can define a set of I/O services that are implemented in UGA firmware for enumerated UGA devices. Service types are associated with UGA I/O request codes and such I/O request codes can be added to a UGA firmware specification. The UGA firmware I/O model is designed to facilitate new I/O request codes and/or new device types being added to a UGA firmware specification while preserving compatibility between UGA clients, UGA runtime environments and UGA firmware.

By employing a recursive enumeration method, UGA firmware supports one or more video child devices that include, but are not limited to, a parent bus, a graphics controller, an output controller, an output port and other device types. For enumerated UGA devices, the UGA firmware can provide an additional device descriptor data that can be interpreted by a system BIOS and IHV video driver, a standardized PnP identifier to support generic child device driver support and a device description string. UGA devices can be associated with a unique context or a shared context can be shared by UGA devices associated with a single UGA adapter.

To enumerate UGA devices, system firmware and/or an operating system traverse a UGA device tree using, for example, a depth first traversal algorithm. UGA firmware method calls (e.g., UgaFwStartDevice, UgaFwGetChildDevice) can be invoked for the devices. In one example of the present invention, a device context creation method and a start method for a parent device are executed before child devices are enumerated and/or started.

The system BIOS and/or operating system pass device context and I/O request types to UGA firmware which, based on the information, can dispatch an I/O handler method for the I/O request and UGA child device. By employing a recursive enumeration method, UGA firmware can support one or more output controllers and/or output ports. Such enumerated ports can be attached to a physical output device (e.g., CRTC monitor, flat panel, television). For enumerated output ports, the system firmware and/or operating system invokes a data acquisition method, (e.g., UgaFwGetEdidSegment) specifying a device context and I/O request type. Based on such information, the UGA firmware dispatches an I/O handler method for the I/O request and the UGA child device. The UGA firmware then returns display identification and configuration data for the output device attached to the output port. Such information can be returned, for example, in the EDID format defined in the VESA (Video Electronics Standards Association), standard. The UGA firmware reads the EDID information from the output device by, for example, DDC (display data channel standard), and/or an implementation specific communication channel. The UGA firmware can, if the EDID data cannot be obtained from the output device, create an EDID.

If the UGA firmware does not implement, or fails while employing a data acquisition method (e.g., UgaFwGetEdidSegment) for an output port device, then the UGA firmware implements a set of device channel I/O routines (e.g., UgaFwDeviceChannelOpen, UgaFwDeviceChannelRead, UgaFwDeviceChannelWrite, UgaFwDeviceChannelClose), which enable system firmware and/or an operating system to communicate directly with output devices over DDC or other implementation specific communication channels.

Similar to processing for output ports, for enumerated output controllers the system firmware and/or operating system invokes a data acquisition method, (e.g., UgaFwGetEdidSegment) specifying a device context and I/O request type. Based on such information, the UGA firmware dispatches an I/O handler method for the I/O request and the UGA child device. The UGA firmware then returns display identification and configuration data for the output controller. Such information can be returned, for example, in the VESA EDID format. EDID data for output controller devices is provided by UGA firmware based on the hardware capabilities of the UGA display adapter. In one example of the present invention, the data acquisition method must be implemented in the UGA firmware for output controller devices.

Concerning power management facilitated by the present invention, a top-down tree traversal can be employed for power up and a bottom-up tree traversal can be employed for power down. For devices, UGA firmware methods (e.g., UgaFwSetPowerState) can be invoked to probe a power state and cause power changes. Such methods can be vetoed, in which case power state setting methods previously invoked can be cancelled. The system firmware and/or operating system can pass device context, I/O request types, power request types, requested device states, and requested power states to UGA firmware. Thus, UGA devices can support multiple power states and UGA firmware can dispatch I/O handler methods for I/O requests and child devices related to such power state management.

One example of the present invention implements UGA as an EFI (Extensible Firmware Interface) driver. Thus, an EFI-UGA Binding Protocol is attached hereto as Appendix B which is considered part of this patent application specification.

Figure 7:
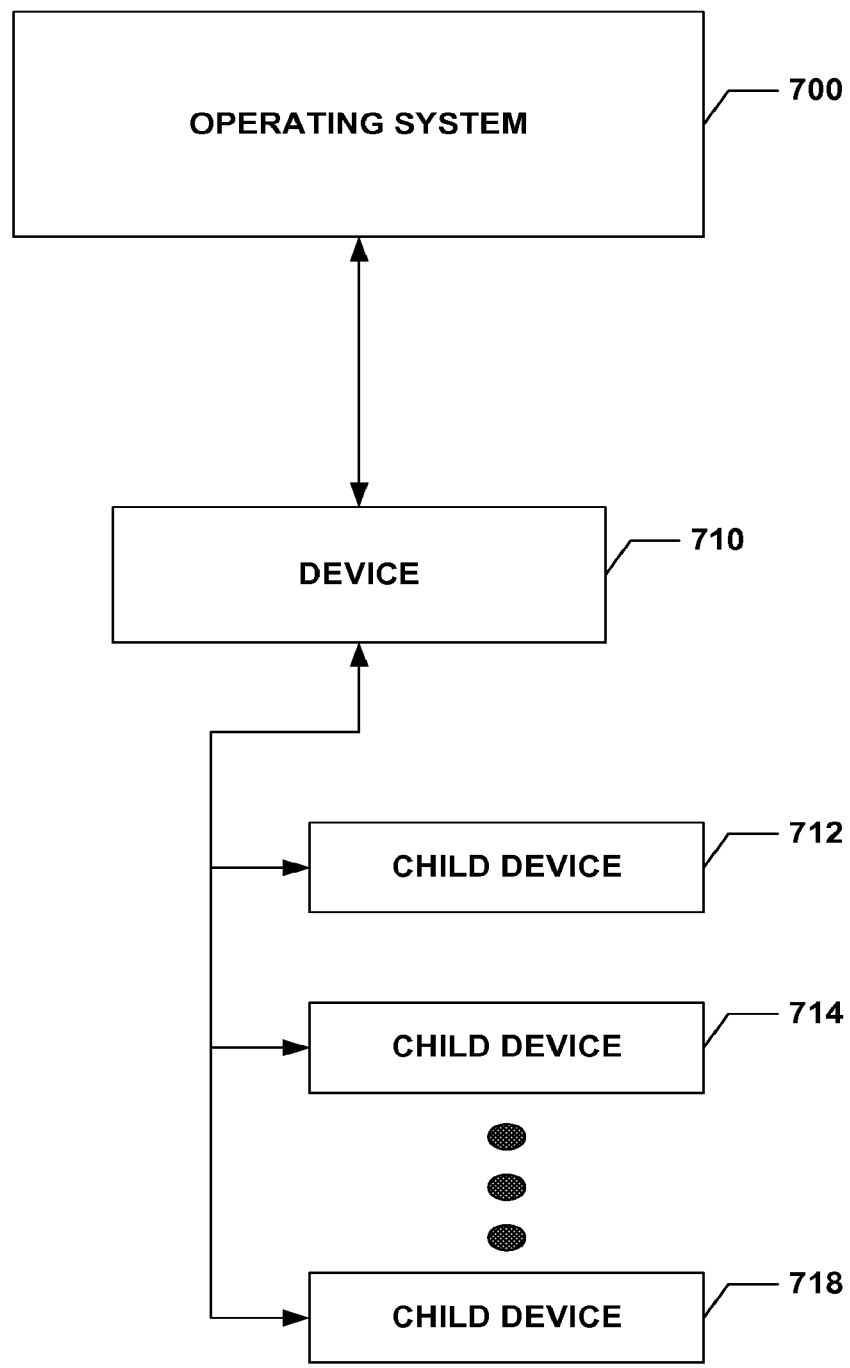
FIG. 7 illustrates a display device with child devices that can interact with the UGA firmware, in accordance with an aspect of the present invention.

FIG. 7 illustrates an operating system 700 interacting with a display device 710 and with its child devices 712 through 718. Conventionally, a VGA system could not interact with such child devices 712 through 718. UGA facilitates enumerating such child devices 712 through 718 through the UGA firmware interface and if the child devices 712 through 718 expose the UGA firmware interface, the operating system 700 can interact with them. Thus, one example of the UGA firmware can support a number of child devices of a variety of types and provide methods for enumerating such child devices, performing power management for such child devices, querying and controlling state for such child devices, setting display modes for such child devices and facilitating fundamental drawing operations.

Figure 8:
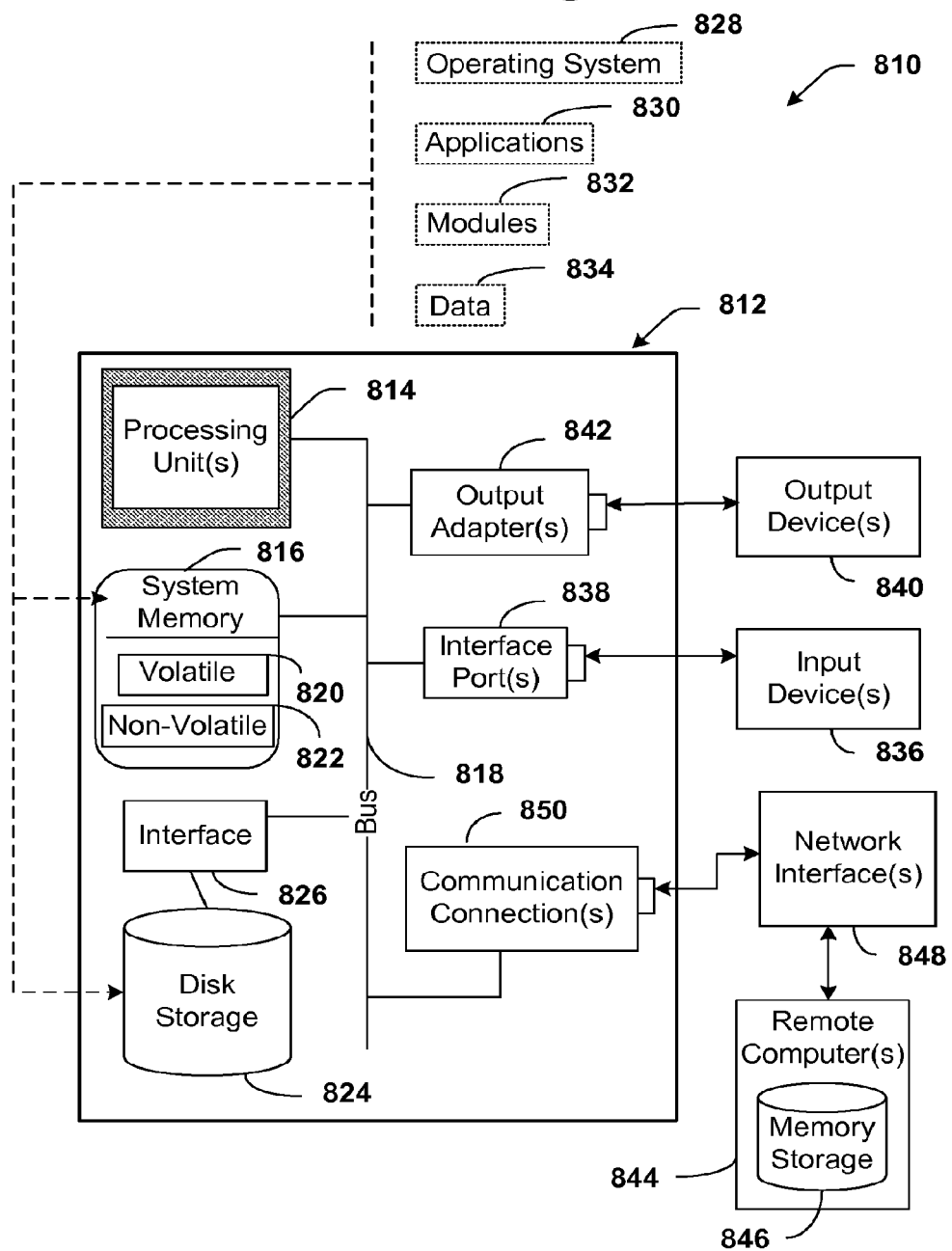
FIG. 8 is a schematic block diagram of an example computing environment in which the present invention may operate, in accordance with an aspect of the present invention.

In order to provide additional context for various aspects of the present invention, FIG. 8 and the following discussion are intended to provide a brief, general description of a suitable computing environment 810 in which the various aspects of the present invention may be implemented. While the invention has been described above in the general context of computer-executable components, instructions and/or operations that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with computer system configurations, including single-processor or multiprocessor computer systems, minicomputers, mainframe computers, personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 8, an exemplary environment 810 for implementing various aspects of the invention includes a computer 812, the computer 812 including a processing unit 814, a system memory 816 and a system bus 818. The system bus 818 couples system components including, but not limited to the system memory 816 to the processing unit 814. The processing unit 814 may be any of various processors. Dual microprocessors and other multi-processor architectures also can be employed as the processing unit 814.

The system bus 818 can be any of several types of bus structure including a memory bus or memory controller, a peripheral bus and a local bus using any of a variety of bus architectures. The system memory 822 includes read only memory (ROM) 820 and random access memory (RAM) 822. A basic input/output system (BIOS), containing the basic routines that help to transfer information between elements within the computer 812, such as during start-up, is stored in ROM 820. The BIOS can include, for example, the UGA firmware.

The computer 812 further includes a hard disk drive 824, a magnetic disk drive 826, (e.g., to read from or write to a removable disk 828) and an optical disk drive 830, (e.g., for reading a CD-ROM disk 832 or to read from or write to other optical media). The hard disk drive 824, magnetic disk drive 826 and optical disk drive 830 can be connected to the system bus 818 by a hard disk drive interface 834, a magnetic disk drive interface 836 and an optical drive interface 838, respectively. The drives and their associated computer-readable media provide nonvolatile storage of data, data structures, computer components, computer-executable instructions, etc. for the computer 812. Although the description of computer-readable media above refers to a hard disk, a removable magnetic disk and a CD, it should be appreciated that other types of media that are readable by a computer, such as zip drives, magnetic cassettes, flash memory cards, digital video disks, cartridges, ASICs, and the like, may also be used in the exemplary operating environment, and further that any such media may contain computer-executable instructions for performing the methods of the present invention.

A number of program modules can be stored in the drives and RAM 822, including an operating system 840, one or more application programs 842, other program modules 844 and program data 846. It is to be appreciated that the present invention can be implemented with various operating systems or combinations of operating systems.

A user can enter commands and information into the computer 812 through a keyboard 848 and a pointing device, such as a mouse 850. Other input devices (not shown) may include a microphone, an IR remote control, a joystick, a game pad, a satellite dish, a scanner, or the like. These and other input devices are often connected to the processing unit 814 through a serial port interface 852 that is coupled to the system bus 818, but may be connected by other interfaces, such as a parallel port, a game port, a universal serial bus ("USB"), an IR (infrared) interface, etc. A monitor 854 or other type of display device is also connected to the system bus 818 via an interface, such as a video adapter 856. In addition to the monitor, a computer typically includes other peripheral output devices (not shown), such as speakers, printers etc.

The computer 812 may operate in a networked environment using logical connections to one or more remote computers, such as a remote computer(s) 858. The remote computer(s) 858 may be a workstation, a server computer, a router, a personal computer, microprocessor based entertainment appliance, a peer device or other common network node, and typically includes many or all of the elements described relative to the computer 812, although, for purposes of brevity, only a memory storage device 860 is illustrated. The logical connections depicted include a local area network (LAN) 862 and a wide area network (WAN) 864. Such networking environments are commonplace in offices, enterprise-wide computer networks, intranets and the Internet.

When used in a LAN environment, the computer 812 is connected to the local network 862 through a network interface or adapter 866. When used in a WAN environment, the computer 812 typically includes a modem 868, or is connected to a communications server on the LAN, or has other means for establishing communications over the WAN 864, such as the Internet. The modem 868, which may be internal or external, is connected to the system bus 818 via the serial port interface 852. In a networked environment, program modules depicted relative to the computer 812, or portions thereof, may be stored in the remote memory storage device 860. It will be appreciated that the network connections shown are exemplary and other means of establishing a communications link between the computers may be used.

Figure 9:
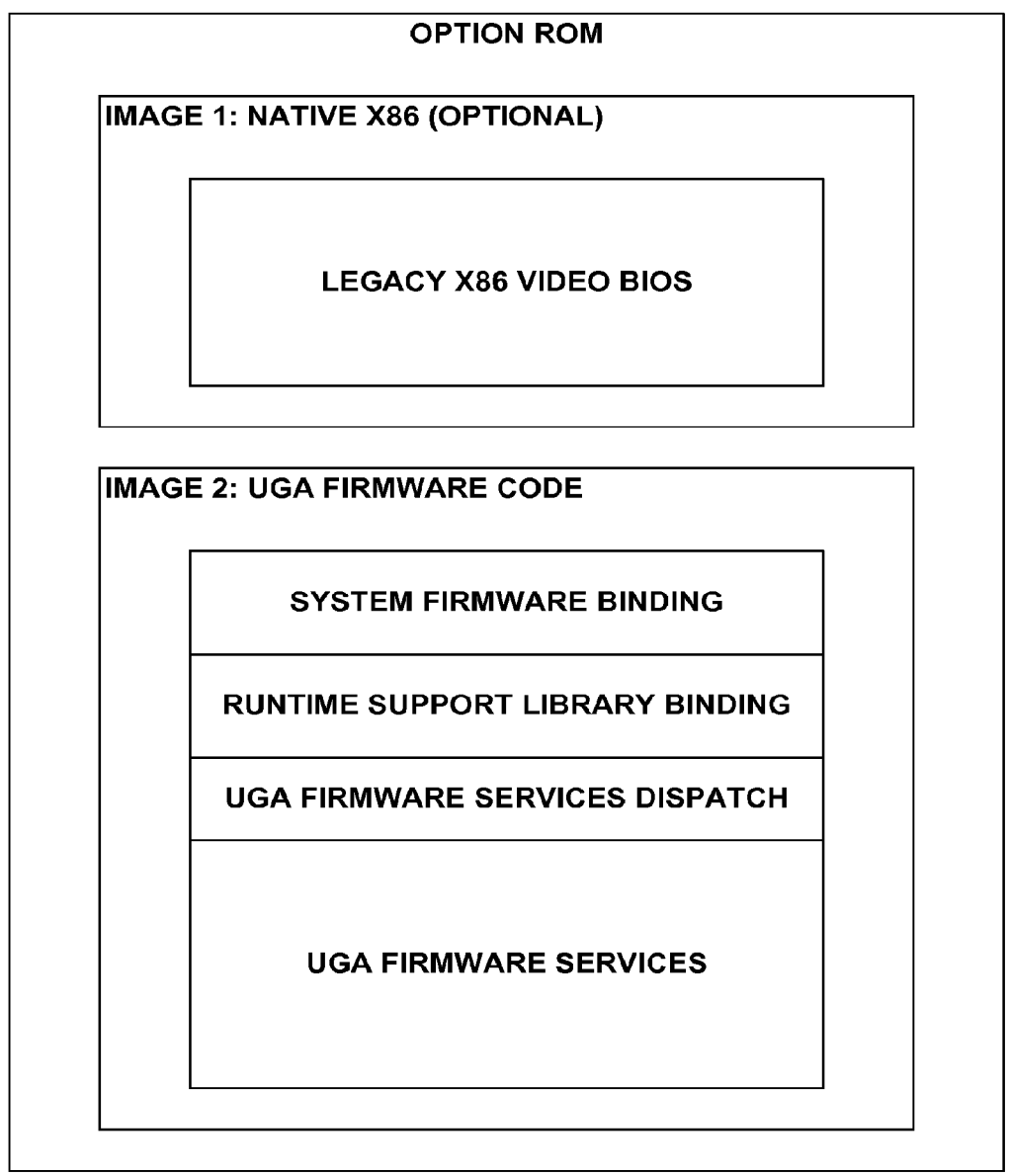
FIG. 9 illustrates a sample option ROM layout of a UGA enabled display adapter, in accordance with an aspect of the present invention.

FIG. 9 illustrates an option ROM in which multiple video adapter images are stored. For example, a first image can support a legacy X86 video BIOS while a second image can support a UGA BIOS. To support the UGA BIOS, the second image can include a firmware specific binding (e.g., EFI to UGA) that facilitates UGA firmware byte code interacting with a runtime environment. The second image can also include a runtime support library binding that facilitates interfacing the system firmware binding and the UGA firmware services dispatch. The UGA firmware services dispatch receive calls intended for a UGA device, identify the device to which a user desires to talk and what service the user desires to have performed. The dispatcher calls the appropriate method in the UGA firmware services. Thus, the ability to store multiple images in an option ROM facilitates concurrent support for legacy systems and UGA systems providing interoperability improvements over conventional systems.

What has been described above includes examples of the present invention. It is of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. A computer implemented system for negotiating output display ranges, comprising:
    a first UGA component that determines ranges of output display capabilities for each of a plurality of display devices connected to the system;
    a second UGA component that determines the intersection of the ranges of output display capabilities; and
    a third UGA component that sets a display mode from the intersection of ranges of output display capabilities.

2. The system of claim 1, wherein determining ranges employs extended display identification data (EDID).

3. The system of claim 1, wherein the ranges are discrete sets of output ranges.

4. The system of claim 1, wherein the ranges are contiguous sets of output ranges.

5. The system of claim 1, wherein at least two of the plurality of display devices have different ranges of output display capabilities with respect to each other.

6. One or more computer readable media containing computer-executable instructions that, when executed by a computing device, provide a system for negotiating output display ranges, comprising:
    a first UGA component that determines ranges of output display capabilities for each of a plurality of display devices connected to the system;
    a second UGA component that determines the intersection of the ranges of output display capabilities; and
    a third UGA component that sets a display mode from the intersection of ranges of output display capabilities.

7. The computer readable media containing computer-executable instructions of claim 6, wherein determining ranges employs extended display identification data (EDID).

8. The computer readable media containing computer-executable instructions of claim 6, wherein the ranges are discrete sets of output ranges.

9. The computer readable media containing computer-executable instructions of claim 6, wherein the ranges are contiguous sets of output ranges.

10. The computer readable media containing computer-executable instructions of claim 6, wherein at least two of the plurality of display devices have different ranges of output display capabilities with respect to each other.

* * * * *